US008856741B2

(12) United States Patent
Maurice et al.

(10) Patent No.: US 8,856,741 B2
(45) Date of Patent: Oct. 7, 2014

(54) JUST IN TIME COMPONENT MAPPING

(75) Inventors: Gilles Maurice, Ottawa (CA); Trevor H. Ward, Kars (CA); Keith McLellan, Ottawa (CA); Jim Leask, Stittsville (CA); Ben Helleman, Stittsville (CA)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/250,469

(22) Filed: Sep. 30, 2011

(65) Prior Publication Data

US 2013/0198720 A1   Aug. 1, 2013

(51) Int. Cl.
G06F 9/44 (2006.01)

(52) U.S. Cl.
USPC ........... 717/122; 717/171; 717/172; 717/173; 717/174; 717/175; 717/176

(58) Field of Classification Search
USPC ........................................ 717/122
See application file for complete search history.

(56) References Cited

U.S. PATENT DOCUMENTS

| 5,347,629 | A | 9/1994 | Barrett et al. |
| 6,574,791 | B1 | 6/2003 | Gauthier et al. |
| 7,000,220 | B1 * | 2/2006 | Booth ............................ 717/110 |
| 7,779,085 | B2 * | 8/2010 | Neil et al. ...................... 709/217 |
| 2002/0078103 | A1 | 6/2002 | Gorman et al. |
| 2003/0131312 | A1 | 7/2003 | Dang |
| 2003/0149761 | A1 | 8/2003 | Baldwin et al. |
| 2004/0083474 | A1 * | 4/2004 | McKinlay et al. ............ 717/176 |
| 2004/0130572 | A1 | 7/2004 | Bala |
| 2006/0136422 | A1 | 6/2006 | Matveief et al. |
| 2006/0242180 | A1 | 10/2006 | Graf et al. |
| 2007/0032287 | A1 | 2/2007 | Osawa |
| 2007/0250783 | A1 | 10/2007 | Wu et al. |
| 2007/0282486 | A1 * | 12/2007 | Walker et al. ................. 700/284 |
| 2008/0028401 | A1 * | 1/2008 | Geisinger ......................... 718/1 |
| 2008/0098291 | A1 | 4/2008 | Bradley et al. |
| 2008/0104146 | A1 | 5/2008 | Schwaab et al. |
| 2009/0177961 | A1 | 7/2009 | Fortini et al. |
| 2010/0042919 | A1 * | 2/2010 | Meyer ............................ 715/700 |
| 2010/0070945 | A1 | 3/2010 | Tattrie et al. |
| 2013/0198714 | A1 | 8/2013 | Moody et al. |

OTHER PUBLICATIONS

United States Patent and Trademark Office, Office Action, U.S. Appl. No. 11/507,863, dated Jun. 14, 2011.

(Continued)

Primary Examiner — Don Wong
Assistant Examiner — Roberto E Luna
(74) Attorney, Agent, or Firm — Kilpatrick Townsend & Stockton LLP

(57) ABSTRACT

One embodiment involves a system comprising a network, a server, and a requesting device. The server and requesting device are connected with the network. The server comprises a processor configured to receive a request from the requesting device and determine information about the requesting device based at least in part on the request. The processor is further configured to determine an abstract representation of an application and at least one mapping from a plurality of mappings based at least in part on the information about the device. The abstract representation comprises a plurality of components. Each mapping comprises an attribute for at least one of the plurality of components. The processor is further configured to generate a version of the application on-the-fly based at least in part on the abstract representation and the at least one mapping and send the version of the application to the requesting device.

27 Claims, 15 Drawing Sheets
(5 of 15 Drawing Sheet(s) Filed in Color)

(56) References Cited

OTHER PUBLICATIONS

United States Patent and Trademark Office, Office Action, U.S. Appl. No. 11/507,863, mailed Mar. 16, 2010.

United States Patent and Trademark Office, Office Action, U.S. Appl. No. 11/507,863, mailed Oct. 7, 2010.

United States Patent and Trademark Office, Office Action, U.S. Appl. No. 11/507,863, mailed Sep. 8, 2009.

Sira, "OACS PCT Quick Reference Guide", May 2002, Version 3: 6 pages.

United States Patent and Trademark Office, Office Action, U.S. Appl. No. 11/507,863, dated Dec. 21, 2011, 34 pages.

US Patent and Trademark Office, Office Action, U.S. Appl. No. 11/507,863, mailed Feb. 15, 2013, 21 pages.

United States Patent and Trademark Office, Office Action, U.S. Appl. No. 11/949,678, mailed Jul. 26, 2011.

United States Patent and Trademark Office, Office Action, U.S. Appl. No. 11/949,678, mailed Aug. 26, 2013.

United States Patent and Trademark Office, Office Action, U.S. Appl. No. 11/949,678, mailed Jan. 31, 2013.

United States Patent and Trademark Office, Office Action, U.S. Appl. No. 11/949,678, mailed Feb. 1, 2013.

Wang et al., "Runtime Software Architecture Based Software Evolution and Adaptation", COMPSAC, 2003, 10 pages.

Final Office Action from Related U.S. Appl. No. 11/507,863, dated Sep. 19, 2013, 19 pages.

\* cited by examiner

ABSTRACT REPRESENTATION AND COMPONENT MAPPINGS
700

```
<application>
    <abstractRepresentation>
        <question language="english">Do you like cheese?<question>
        <question language="spanish">¿Te gusta el queso?</question>
        <answers>
            <language type="english">
                <answer>Yes</answer>
                <answer>No</answer>
                <answer>Only on game nights</answer>
            </language>
            <language type="spanish">
                <answer>Sí</answer>
                <answer>No</answer>
                <answer>Sólo en las noches de juego</answer>
            </language>
        </answers>
        <button language="english">Submit</button>
        <button language="spanish">Presentar</spanish>
    </abstractRepresentation>
    <device type="desktop">
        <background>white</background>
        <question>
            <color>black</color>
        </question>
        <answer>
            <color>gray</color>
            <type>radio</type>
        </answer>
        <button>
            <color>black</color>
            <background>yellow</green>
        </button>
    </device>
    <device type="tablet">
        <background>white</background>
        <question>
            <color>black</color>
        </question>
        <answer>
            <color>gray</color>
            <type>radio</type>
        </answer>
        <button>
            <color>black</color>
            <background>yellow</green>
        </button>
    </device>
    <device type="mobile" touchscreen="false">
        <background>black</background>
        <question>
            <color>white</color>
        </question>
        <answer>
            <color>black</color>
            <background>red</background>
        </answer>
        <button>
            <color>black</color>
            <background>green</green>
            <position>right</position>
        </button>
    </device>
    <device type="mobile" touchscreen="true">
        <background>black</background>
        <question>
            <color>white</color>
            <position>center</position>
        </question>
        <answer>
            <color>black</color>
            <background>red</background>
        </answer>
        <button>
            <hide>true</hide>
        </button>
    </device>
</application>
```

FIGURE 7

| MOBILE (TOUCHSCREEN & NOT TOUCHSCREEN) MAPPING |
|---|
| 800 |

```
<componentMapping>
        <background>black</background>
        <question>
                <color>white</color>
                if (touchscreen==enabled) then {
                        <position>center</position>
                }
        </question>
        <answer>
                <color>black</color>
                <background>red</background>
        </answer>
        <button>
                if(touchscreen==enabled) then {
                        <hide>true</hide>
                } else {
                        <color>black</color>
                        <background>green</background>
                        <position>right</position>
                }
        </button>
</componentMapping>
```

FIGURE 8

Do you like cheese?

- ○ Yes
- ○ No
- ○ Only on game nights

[ Submit ]

FIGURE 10

```xml
- <target name="flex">
  - <componentType name="wrapper">
      <concreteComponent name="buttonBar" class="ga.wrappers.CobaltBar" />
      <concreteComponent name="standard" class="ga.wrappers.CobaltStandard" />
      <concreteComponent name="tree" class="ga.wrappers.CobaltTree" />
      <concreteComponent name="buttonBar-alt" class="ga.wrappers.ButtonBar" />
      <concreteComponent name="standard-alt" class="ga.wrappers.LeftAccordion" />
      <concreteComponent name="tree-alt" class="ga.wrappers.LeftMultilevel" />
      <concreteComponent name="workspace" class="ga.wrappers.Workspace" />
      <concreteComponent name="accordion"
         class="com.adobe.guides.spark.wrappers.components.StandardWrapperHost"
         skinClass="com.adobe.guides.spark.wrappers.skins.AccordionSkin" />
    </componentType>
  + <componentType name="layout">
  - <componentType name="control">
      <concreteComponent name="checkBoxList" class="ga.controls.CheckBoxList" />
      <concreteComponent name="horizontalRule" class="ga.controls.HRule" />
      <concreteComponent name="radioButtonList" class="ga.controls.RadioButtonList" />
      <concreteComponent name="imageField" class="ga.uiComponents.ImageField" />
      <concreteComponent name="embeddedPanel" class="ga.uiComponents.PanelComponent" />
      <concreteComponent name="staticList" class="ga.uiComponents.StaticList" />
      <concreteComponent name="staticText" class="ga.uiComponents.StaticText" />
      <concreteComponent name="staticTextArea" class="ga.uiComponents.StaticTextMultiline" />
      <concreteComponent name="submitButton" class="ga.uiComponents.SubmitGuideButton" />
      <concreteComponent name="text" class="mx.controls.Text" />
      <concreteComponent name="textInputComb" class="ga.uiComponents.TextInputComb" />
      <concreteComponent name="textInputMask" class="ga.uiComponents.TextInputMask" />
      <concreteComponent name="textInput" class="ga.uiComponents.TextInputPicture" />
      <concreteComponent name="textInputSymbol" class="ga.uiComponents.TextInputSymbol" />
      <concreteComponent name="button" class="spark.components.Button" />
      <concreteComponent name="checkBox" class="spark.components.CheckBox" />
      <concreteComponent name="dropDownList" class="spark.components.DropDownList" />
      <concreteComponent name="dateField" class="mx.controls.DateField" />
      <concreteComponent name="horizontalSlider" class="spark.components.HSlider" />
      <concreteComponent name="list" class="spark.components.List" />
      <concreteComponent name="numericStepper" class="spark.components.NumericStepper" />
      <concreteComponent name="radioButton" class="spark.components.RadioButton" />
      <concreteComponent name="textArea" class="spark.components.TextArea" />
      <concreteComponent name="verticalSlider" class="spark.components.VSlider" />
    </componentType>
  </target>
 </componentMap>
</guideConfig>
```

FIGURE 14   1310

```
- <guideConfig version="1.0.0">
  - <componentMap>
    - <target name="flex">
      - <componentType name="wrapper">
          <concreteComponent name="standard" class="wrappers.MobileWrapper" />
        </componentType>
      - <componentType name="control">
          <concreteComponent name="radioButtonList" class="RadioButtonList3P" />
        </componentType>
      </target>
    </componentMap>
  </guideConfig>
```

FIGURE 15                1330

JUST IN TIME COMPONENT MAPPING

FIELD OF THE INVENTION

This disclosure relates generally to application development and more particularly relates to the efficient development of versions of an application for various electronic devices with at least certain specifications.

BACKGROUND

Application development typically involves writing code in a particular programming language for operation on a device with at least certain specifications. For example, an application may be developed to operate on a device running Windows® XP. If the device is running an operating system other than Windows® XP, a user may not be able to install the application on the device. For example, if a device is running Linux a user may not be able to install an application that was developed for Windows® XP. Similarly, if an application was developed for a 64-bit operating system and a device is running a 32-bit operating system, then a user may not be able to install the application on the device. In other situations, an application may not be able to be installed on a device or the application may not function or operate properly on a device because the device has different specifications or settings than those for which the application was developed. For example, an application may be developed to operate on a device running Internet Explorer® 8 that has JavaScript enabled. If the device does not have Internet Explorer® 8 or if JavaScript is disabled, then the application may not function properly on the device. Similarly, if an application was developed to operate a device having a display with a resolution of at least 1920×1080 pixels and the device running the application only has a display with a resolution of 960×640 pixels, then the application may not function properly or a user's experience in interacting with the application may be diminished.

To address some of these concerns, application developers often develop multiple versions of an application where each version is directed to a particular device with at least certain specifications. For example, an application developer may develop a 32-bit version of the application as well as a 64-bit version of an application. Similarly, an application developer may develop a Windows® version of an application and a Linux version of the application. Furthermore, an application developer may develop a version of an application optimized to be viewed on a desktop display as well as a version of the application optimized to be viewed on the display of a mobile device. Thus, an application developer may develop numerous versions of an application in order for the application to function properly on various devices and platforms. Application development in such an environment is often repetitive, inefficient, and costly. Systems and methods that address at least some of these disadvantages and deficiencies are needed.

SUMMARY

One exemplary embodiment involves receiving, by a processor, a request from a device and determining, by a processor, information about the device based at least in part on the request. The embodiment further provides determining, by a processor, a version of an application based at least in part on the information about the device. The version of the application may be based at least in part on an abstract representation of the application and a mapping. The abstract representation comprises a component and the mapping comprises an attribute used for the component in less than all versions of the application. The embodiment further provides sending, by a processor, the version of the application to the device.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

The patent or application file contains at least one drawing executed in color. Copies of this patent or patent application publication with color drawing(s) will be provided by the Office upon request and payment of the necessary fee.

These and other features, aspects, and advantages of the present disclosure are better understood when the following Detailed Description is read with reference to the accompanying drawings, where:

FIG. 7 is an illustrative abstract representation and component mappings according to an embodiment;

FIG. 8 illustrates component mappings according to an embodiment;

FIG. 10 illustrates a rendering of a desktop version of an application on a desktop computer based on the abstract representation and desktop mapping shown in FIG. 4 according to an embodiment;

FIG. 14 illustrates an enlarged view of a partial mapping shown in FIG. 13 according to an embodiment; and FIG. 15 illustrates an enlarged view of a partial mapping shown in FIG. 13 according to an embodiment.

DETAILED DESCRIPTION

Figure 1:
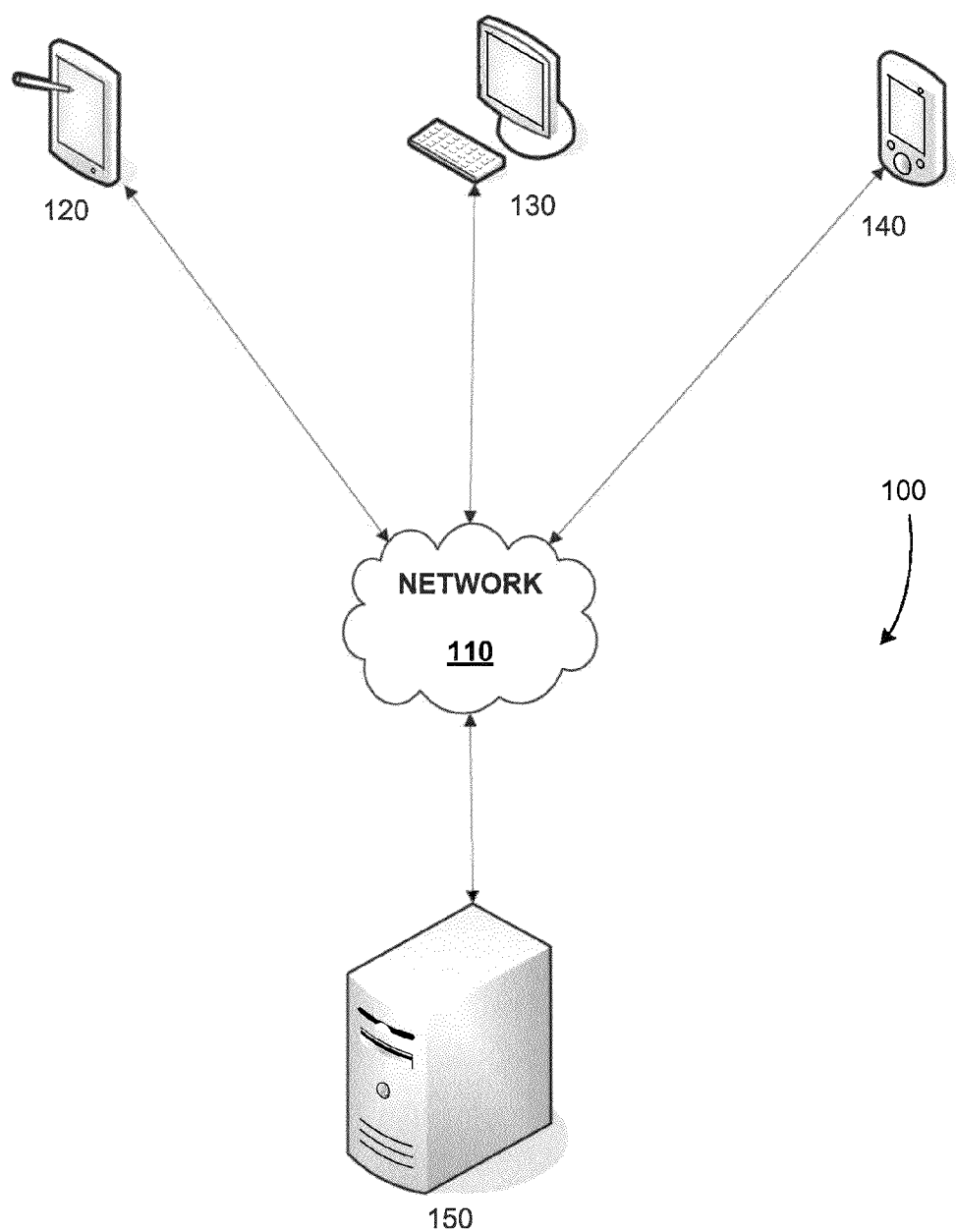
FIG. 1 is a system diagram depicting exemplary computing devices in an exemplary computing environment according to an embodiment.

Systems and methods disclosed herein relate generally to application development and more particularly relate to the efficient development of versions of an application for various devices with at least certain specifications. Embodiments described herein facilitate the creation of an application by enabling an application developer to create an abstract representation and then map the abstract representation to one or more component mappings that can be used to customize the application for devices with at least certain specifications. For example, an application developer may create an abstract representation and one or more component mappings in an application development environment (ADE). An abstract representation may include one or more files that identifies various components of an application. A component mapping may include one or more files that map to at least one of the components in the abstract representation.

In embodiments, two or more component mappings can each map to at least one component in an abstract representation. In this embodiment, multiple versions of the application may be generated based at least in part on one or more of the component mappings. For example, an application developer may be tasked with the development of one version of an application customized for desktop computers and a second version of the application customized for mobile devices. In this example, rather than creating two entirely separate versions of the application, the developer could create an abstract representation and create a first component mapping for the desktop version and a second component mapping for the mobile version. Versions of the application can be based on the abstract representation and one or more component mappings and sent to or installed on various devices. Thus, a first version of the application may be based on the abstract representation and the first component mapping. This first version of the application could then be sent to or installed on a desktop computer. A second version of the application could be compiled based on the abstract representation and the second component mapping. This second version of the application could then be sent to or installed on a mobile device. Thus, in embodiments, an application developer can create an abstract representation along with one or more component mappings that can be used to generate or compile one or more versions of an application that can be sent to or installed on various devices with at least certain specifications.

In one embodiment, a version of an application may be determined by a server and sent to a requesting device. For example, an application developer may create an abstract representation as well as a first component mapping for desktop computers, a second component mapping for mobile devices without a touchscreen, and a third component mapping for mobile devices with a touchscreen. In this embodiment, the abstract representation, first component mapping, second component mapping, and third component mapping may be stored on a server. A device may send a request to the server requesting the application. Based on the request, the server may analyze one or more features of the requesting device and determine a version of the application that is best suited for the device. For example, if a requesting device having a display with a resolution of 1920×1080 pixels requests the application from the server, then the server may determine that the version of the application customized for desktop computers should be sent to the device. Similarly, if a requesting device having a display with a resolution of 960×640 pixels and no touchscreen requests the application from the server, then the server may determine that the version of the application customized for mobile devices without touchscreens should be sent to the device. Likewise, if a requesting device having a display with a resolution of 960× 640 pixels and a touchscreen requests the application from the server, then the server may determine that the version of the application customized for mobile devices with touchscreens should be sent to the device.

After the server determines which version of the application should be sent to the requesting device, the server sends the application to the requesting device. For example, in an embodiment, the server comprises pre-compiled versions of the application and sends the determined version of the application to the requesting device. In embodiments, the server may generate the application on-the-fly (i.e., after receiving the request) based on the abstract representation and a determined component mapping and send that version of the application to the requesting device. Thus, the requesting device may receive a version of the application that the server determines should be sent to the requesting device.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System

FIG. 1 illustrates a system diagram depicting exemplary computing devices in an exemplary computing environment according to an embodiment. The system 100 shown in FIG. 1 includes three requesting devices, 120-140, and a server 150. Each of the requesting devices, 120-140, and the server 150 are connected to a network 110. In this embodiment, each of the requesting devices, 120-140, is in communication with the server 150 through the network 110. Thus, each of the requesting devices, 120-140, can send messages to the server 150 and receive messages from the server 150 through the network 110. Likewise, the server 150 can send messages to any or all of the receiving devices, 120-140, and can receive messages from any or all of the receiving devices, 120-140, through the network 110.

In embodiments, the network 110 shown in FIG. 1 facilitates communications between the requesting devices, 120-140, and the server 150. The network 110 may be any suitable number or type of networks or links, including, but not limited to, a dial-in network, a local area network (LAN), wide area network (WAN), public switched telephone network (PSTN), the Internet, an intranet or any combination of hardwired and/or wireless communication links. In one embodiment, the network 110 may be a single network. In other embodiments, the network 110 may comprise two or more networks. For example, the requesting devices 120-140 may be connected to a first network and the server 150 may be connected to a second network and the first and the second network may be connected. Numerous other network configurations would be obvious to a person of ordinary skill in the art.

In embodiments, a requesting device may be any device capable of communicating with a network, such as network 110, and capable of sending and receiving information to and from another device. For example, in FIG. 1, one requesting device may be a tablet computer 120. The tablet computer 120 may include a touch-sensitive display and be able to communicate with the network 110 by using a wireless network interface card. Another device that may be a requesting device shown in FIG. 1 is a desktop computer 130. The desktop computer 130 may be in communication with a display and be able to connect to the network 130 through a wired network connection. The desktop computer 130 may be in communication with any number of input devices such as a keyboard of a mouse. In FIG. 1, a mobile phone 140 may be a requesting device. The mobile phone 140 may be able to communicate with the network 110 over a wireless communications means such as TDMA, CDMA, GSM, or WiFi.

In embodiments, a device receiving a request from another device may be any device capable of communicating with a network, such as network 110, and capable of sending and receiving information to and from another device. For example, in the embodiment shown in FIG. 1, the server 150 may be a device receiving a request from another device (i.e. requesting devices 120-140) and may be in communication with the network 110. In embodiments, a receiving device may be in communication with one or more additional devices, such as additional servers. In one embodiment, a server may communicate with one or more additional devices to process a request received from a requesting device. For example, the server 150 in FIG. 1 may be in communication with a plurality of additional servers, at least one of which may be used to process at least a portion of a request from any of the requesting devices 120-140.

Illustrative Requesting or Receiving Device

Figure 2:
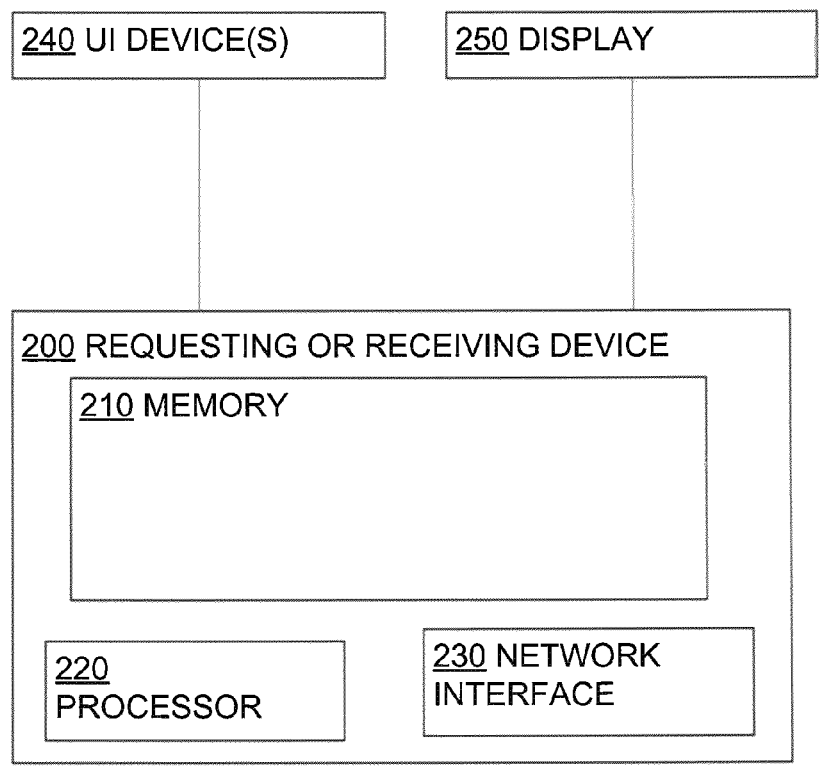
FIG. 2 is a block diagram depicting an exemplary requesting or receiving device according to an embodiment.

FIG. 2 is a block diagram depicting an exemplary requesting or receiving device according to an embodiment. As shown in FIG. 2, the device 200 comprises a computer-readable medium such as a random access memory (RAM) 210 coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. In one embodiment, the device 200 may comprise a single type of computer-readable medium such as random access memory (RAM). In other embodiments, the device 200 may comprise two or more types of computer-readable medium such as random access memory (RAM) and a disk drive. The device 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, Visual Basic, Java, Python, Perl, JavaScript, and ActionScript®. In an embodiment, the device 200 comprises a single processor 220. In other embodiments, the device 200 comprises two or more processors.

The device 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The device 200 may comprise two or more network interfaces 230 for communication over one or more networks.

The device 200 may comprise or be in communication with a number of external or internal devices such as a mouse, a CD-ROM, DVD, a keyboard, a display, audio speakers, one or more microphones, or any other input or output devices. For example, the device 200 shown in FIG. 2 is in communication with various user interface devices 240 and a display 250. Display 250 may use any suitable technology including, but not limited to, LCD, LED, CRT, and the like.

Device 200 may be a server, a desktop, a personal computing device, a mobile device, or any other type of electronic devices appropriate for providing one or more of the features described herein.

Method of Creating Multiple Versions of an Application

Figure 3:
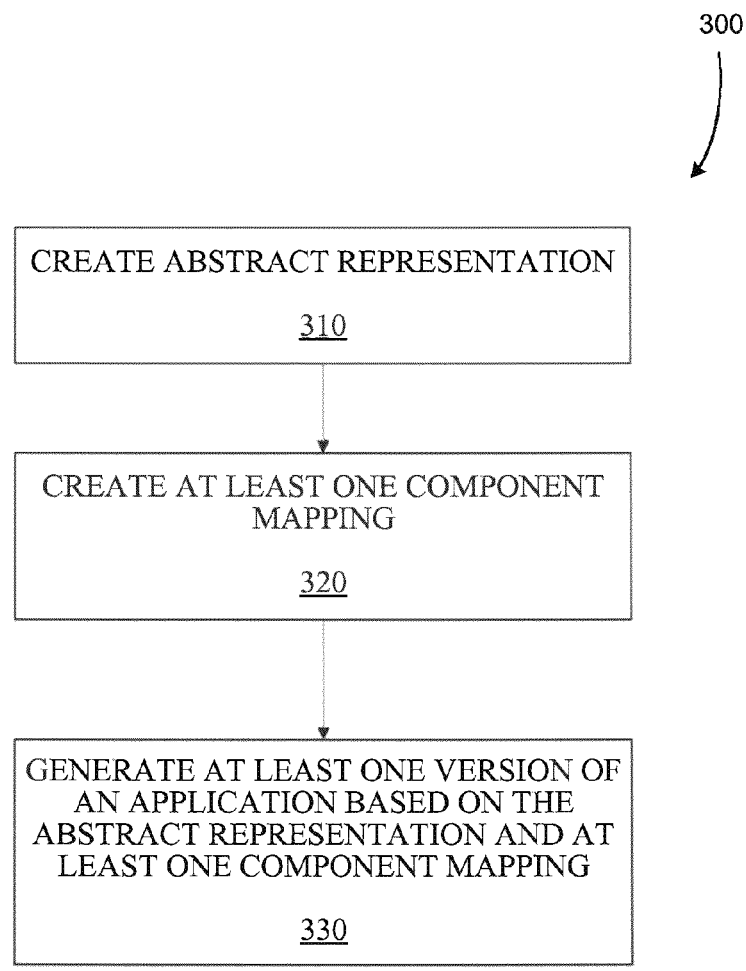
FIG. 3 is a flow chart illustrating a method of generating at least one version of an application based on an abstract representation and at least one component mapping according to an embodiment.

Referring now to FIG. 3, FIG. 3 illustrates a flow chart directed to a method 300 of generating at least one version of an application based on an abstract representation and at least one component mapping according to an embodiment. The description of the method 300 of FIG. 3 will be made with respect to FIGS. 4, 5, 6, and 7 which each illustrate an abstract representation and one or more component mappings according to an embodiment. In embodiments, the abstract representation and one or more component mappings shown in FIGS. 4, 5, 6, and 7 can be used to create at least one version of an application based at least in part on an abstract representation and at least one of the component mappings.

Figure 4:
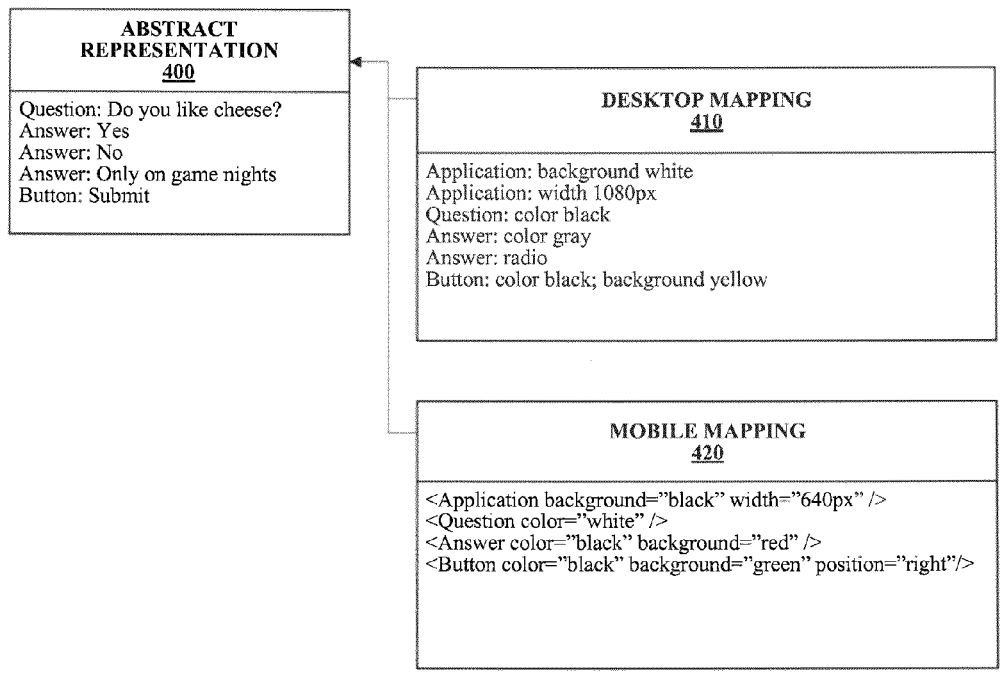
FIG. 4 is an illustrative abstract representation and component mappings according to an embodiment.
Figure 5:
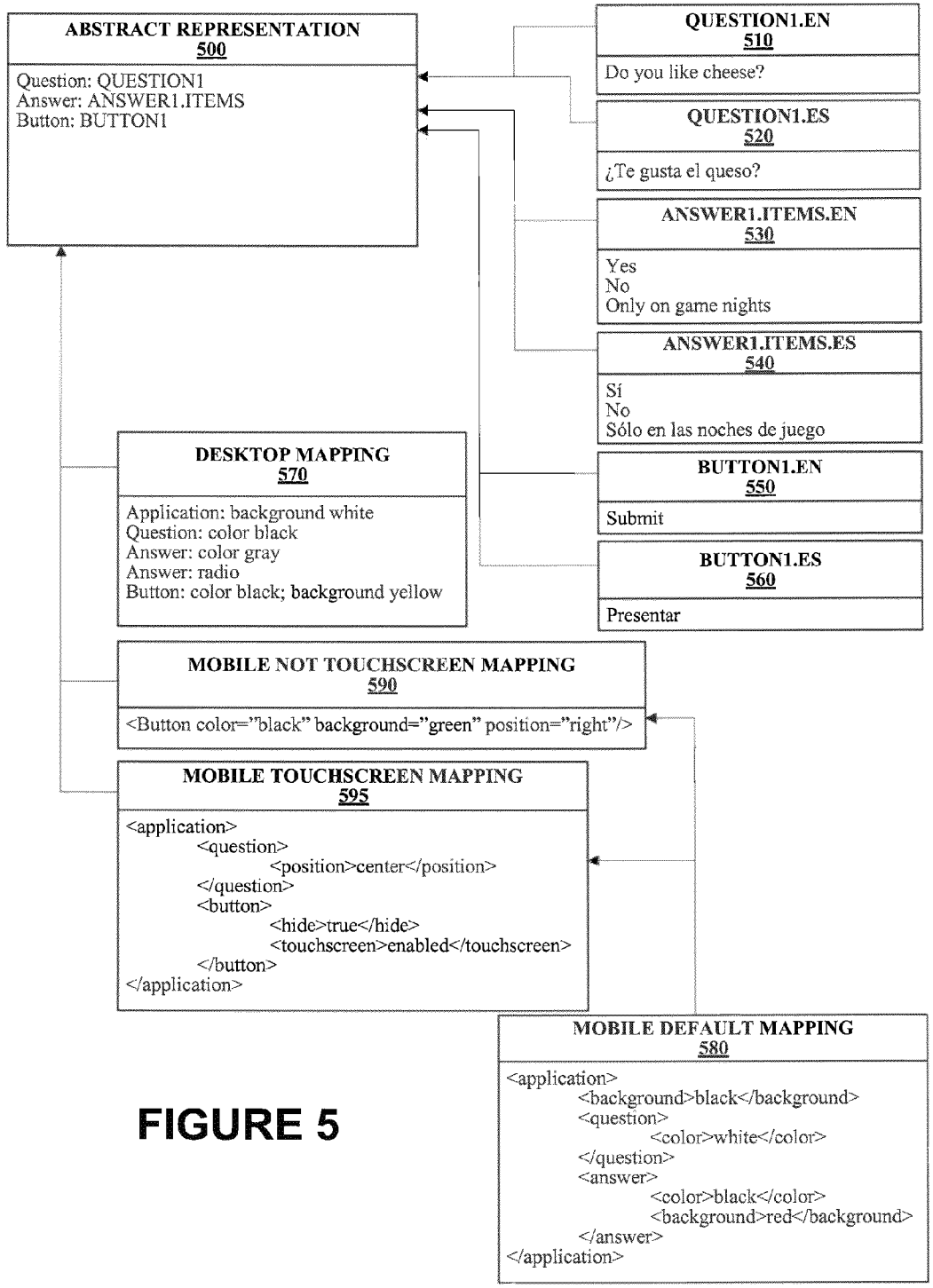
FIG. 5 is an illustrative abstract representation and component mappings according to an embodiment.

The method 300 shown in FIG. 3 begins with the creation of an abstract representation 310. An abstract representation may comprise or reference one or more files that identify various components of an application. For example, in FIGS. 4, 5, 6, and 7, each figure illustrates an abstract representation (400, 500, 600, 700, respectively) that describes three components: Question, Answer, and Button. In embodiments, an abstract representation can include text related to a component. For example, in FIG. 4, the abstract representation 400 includes the text "Do you like cheese?" for the question component, the text "Yes", "No", and "Only on game nights" for the answer component, and the text "Submit" for the button component. In other embodiments, an abstract representation may include a reference to one or more files containing text related to a component. For example, the abstract representation 500 shown in FIG. 5 references numerous files. In FIG. 5, the question component references QUESTION1.EN 510 and QUESTION1.ES 520, the answer component references ANSWER1.ITEMS.EN 530 and ANSWER1.ITEMS.ES 540, and the button component references BUTTON1.EN 550 and BUTTON1.ES 560. Each of these files 510-560 provide either an English text or a Spanish Text for one component in the abstract representation 500.

Figure 6:
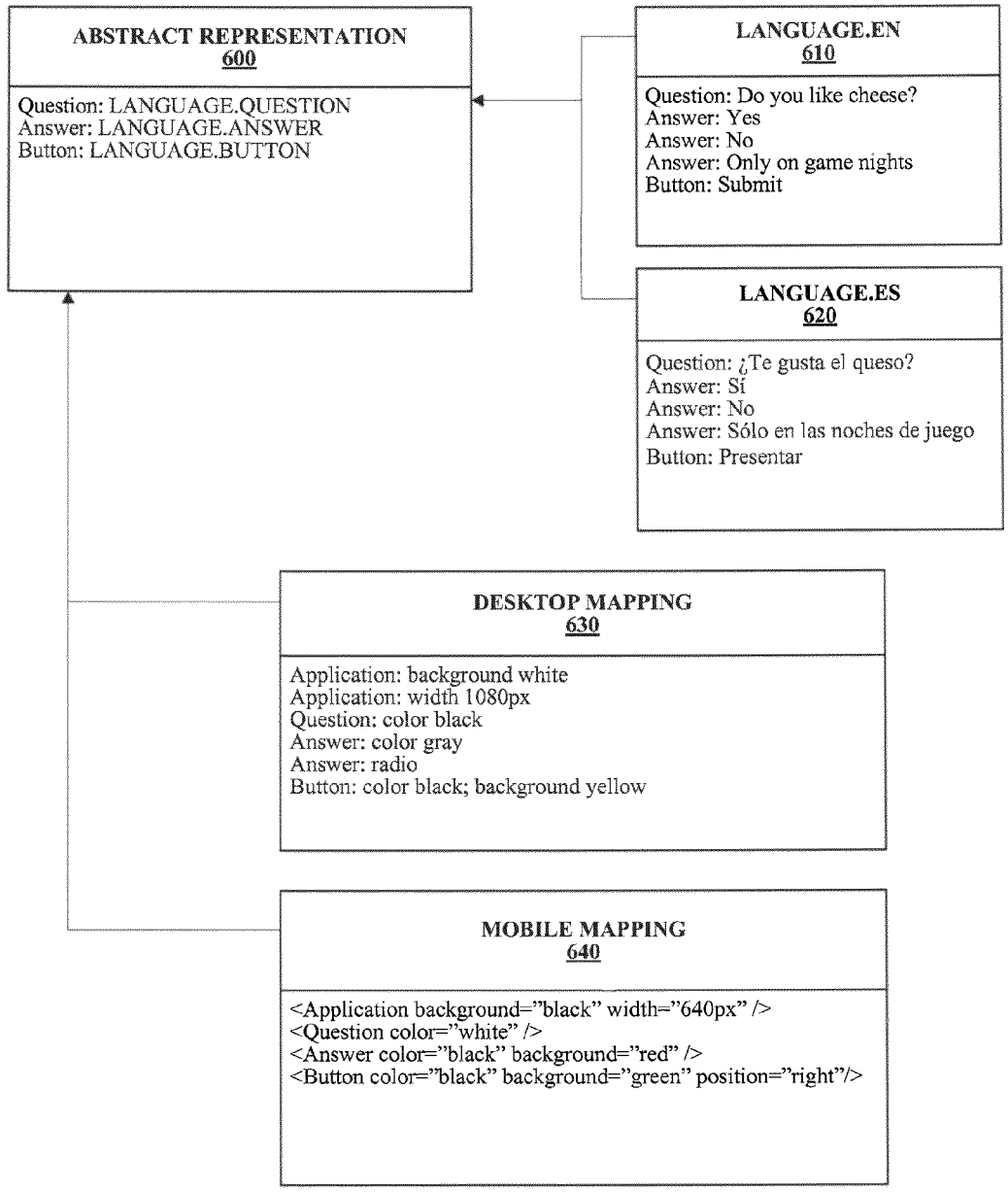
FIG. 6 is an illustrative abstract representation and component mappings according to an embodiment.

Another embodiment is shown in FIG. 6. In this embodiment, the components described in the abstract representation 600 reference both an English language file 610 and a Spanish language file 620. In FIG. 6, the English language file 610 contains the text for each component in English and the Spanish language file 620 contains the text for each component in Spanish. Thus, in the embodiment shown in FIG. 5, the components are specified in an abstract representation 500 and reference various files 510-560 based on the component and the language whereas in the embodiment shown in FIG. 6 the components are specified in an abstract representation 600 and references files 610-620 based solely on the language without regard to the components in the abstract representation 600. Numerous other embodiments and various implementations regarding an abstract representation and various components in an abstract representation will be understood by those of ordinary skill in the art.

In one embodiment, an abstract representation may comprise any number of components. A component, in turn, can describe an item or function, or both, in a version of an application. As discussed above, the embodiment shown in FIG. 4 includes an abstract representation 400 with a question component, an answer component, and a button component. In this embodiment, the question component primarily provides the text for the question, though attributes such as color, size, and location for the question component may be specified in one or more component mappings 410, 420. The answer component in FIG. 4 provides text for the various answers. The answer component may also be associated with one or more functions because one or more answers may be selectable by a user interacting with a version of the application. Various attributes or functions, or both, for the answer component may be specified in one or more component mappings 410, 420. The button component in FIG. 4 also provides a text or image for the component. The button component may also be associated with one or more functions such as submitting an answer to the question. Various attributes or functions, or both, for the button component may be specified in one or more component mappings 410, 420.

In this embodiment, the question component and the answer component may be considered an item. The button component, on the other hand, describes a function of the application—i.e., to submit the answer to the question. In embodiments, a component may include items such as a textual item, a list of one or more selectable items, an input, other form-based fields, navigational functions, other functions, etc. For example, the button component in FIG. 4 may be considered a navigational function. In other embodiments, a navigation-based component may direct a user to a different part of the application. For example, if an abstract representation contains three questions, a "Submit" button for the first question may direct the user to the second question. Thus, in embodiments an abstract representation may contain one or more components that are not displayed to a user of a version of an application when the application is launched. Furthermore, navigational components may direct a user to various portions of an application. In embodiments, a navigational component may also direct a cursor displayed on the screen.

In embodiments, an abstract representation may reference numerous languages. For example, in FIG. 5 each component in the abstract representation 500 includes a reference to an English text 510, 530, 550 and a Spanish text 520, 540, 560 for the component. In FIG. 6, the abstract representation 600 contains a reference to an English language file 610 and a Spanish language file 620. In this embodiment, the English language file 610 contains English text for each component in the abstract representation 600. Likewise, the Spanish language file 620 contains Spanish text for each component in the abstract representation 600. In one embodiment, an abstract representation may include numerous languages. For example, in FIG. 7 each component in the abstract representation 700 includes both English and Spanish text.

In one embodiment, an abstract representation may be stored in any number of formats or languages. An abstract representation may be stored in a text file. For example, in FIG. 4 the abstract representation 400 is a text file that separates components from text by using a colon. Thus, in FIG. 4 "Question" is a component and "Do you like cheese?" is the text of the question. The "Answer" component in FIG. 4 has three potential answers: "Yes", "No", and "Only on game nights". In the embodiment shown in FIG. 4, each potential answer is entered on a separate line. In other embodiments, a component and multiple answers may be on a single line. Thus, in one embodiment, a component may be listed, followed by a colon, and then followed by multiple potential answers separated by a comma. For example, referring to FIG. 4, the three answers could be listed on one line stating "Answer: Yes, No, Only on game nights". Numerous other embodiments and various implementations will be understood by those of ordinary skill in the art.

In embodiments, an abstract representation may be in any number of formats or written in any number of languages. An abstract representation may be written in a declarative language. For example, in FIG. 7 the abstract representation 700 is in a tag-based format. An abstract representation may be written in a procedural language. Furthermore, an abstract representation may be written in a combination of declarative languages, procedural languages, or both. In various embodiments, an abstract representation may be in one or more of the following languages, including but not limited to: ActionScript®, ASP, C, C++, HTML, JAVA, JavaScript, JSON, MXML, PHP, XML, or XSLT. Furthermore, an abstract representation may be stored in one or more text files. In embodiments, an abstract representation may be stored in one or more data stores. An abstract representation may be in an archive or compressed format, or both, such as JAR, ZIP, RAR, ISO, or TAR. In some embodiments, an abstract representation may be compiled whereas in other embodiments an abstract representation may not be compiled. A combination of languages, formats, and/or data stores may be used to define an abstract representation according to various embodiments.

Referring back to FIG. 3, after creating an abstract representation 310, the method 300 proceeds to block 320. In block 320, at least one component mapping is created. For example, in FIG. 4, two component mappings 410, 420 have been created. One of the two component mappings shown in FIG. 4 is a desktop mapping 410. The desktop mapping 410 includes information that can be used to customize a version of the application based on the desktop mapping 410 and the abstract representation 400. In FIG. 4, the desktop mapping 410 provides that this version of the application should have a white background and a width of 1080 pixels. In addition, the desktop mapping 410 provides that the color of the text of the question should be black, that the color of the text of each answer should be gray, that each answer should be shown with a radio selection, and that the button should have black text with a yellow background. The mobile mapping 420 provides that this version of the application should have a black background and a width of 640 pixels. In this mapping 420, the color of the text of the question should be white and the color of the text of each answer should be black with a red background. In addition, the mobile mapping 420 provides that the text of the button should be black, the button should have a green background, and that the button should be positioned on the right side of the screen.

A component mapping may comprise or reference one or more files that map to at least one of the components in the abstract representation. For example, in FIG. 5 four component mappings 570, 580, 590, 595 are shown: Desktop Mapping 570, Mobile Default Mapping 580, Mobile Not Touchscreen Mapping 590, and Mobile Touchscreen Mapping 595.

In this embodiment, the Desktop Mapping 570 is customized for a desktop computer, the Mobile Default Mapping 580 is customized for a mobile device, the Mobile Not Touchscreen Mapping 590 is customized for a mobile device without a touchscreen, and the Mobile Touchscreen Mapping 595 is customized for a mobile device with a touchscreen.

In one embodiment, one or more attributes or functions of a component may be customized by one or more component mappings. For example, in FIG. 5 the Default Mobile Mapping 580 defines attributes of the question and answer components in the abstract representation 500 and the application in general, i.e. the background color. In the embodiment shown in FIG. 5, if the Mobile Touchscreen Mapping 595 is selected, then the attributes of the button component in the abstract representation 500 is determined by this mapping 595. In addition, in this embodiment, the position of the question component in the abstract representation 500 is determined by the Mobile Touchscreen Mapping 595. In one embodiment, the attributes from one component mapping may be incorporated into a second component mapping. For example, the attributes of the Mobile Default Mapping 580 may be incorporated into the Mobile Touchscreen Mapping 595. Thus, if the Mobile Touchscreen Mapping 595 is selected, then the attributes for the question and button components as well as the question and answer components in the abstract representation may be determined by the Mobile Touchscreen Mapping 595 and the Mobile Default Mapping 580.

In one embodiment, there is a hierarchy of component mappings such that a higher-priority component mapping determines an attribute for a component in the abstract representation if two mappings attempt to define the same attribute. For example, in one embodiment, if the Mobile Touchscreen Mapping 595 shown in FIG. 5 included "<color>orange</color>" as an attribute to the question component and the Mobile Touchscreen Mapping 595 is selected, then the color of the text should be orange as opposed to white because the Mobile Touchscreen Mapping 595 has a higher priority than the Mobile Default Mapping 580. Thus, in one embodiment, a more customized component mapping may override one or more attributes or functions of a default component mapping or a lower priority component mapping.

In one embodiment, one or more component mappings may be combined into a single file. For example, in FIG. 7, four component mappings 700 (i.e. desktop, tablet, mobile without touchscreen, mobile with touchscreen) are described in a single tag-based file. Furthermore, FIG. 8 illustrates component mappings 800 for both touchscreen and non-touchscreen component mappings in a single file according to an embodiment. In FIG. 8, if a touchscreen is enabled on the mobile device then a "position center" attribute is included in the component mapping for the Mobile Mapping; otherwise, the position center attribute is not included in the component mapping for the Mobile Mapping. In addition, in FIG. 8 if a touchscreen is enabled then the button is not displayed. In this embodiment, a user can select an answer to a question by touching a location on the touchscreen corresponding to the answer the user wishes to select. Thus, in this embodiment, the answer component may provide one or more functions that determines the next steps for an application as opposed to the button component. If a device does not have a touchscreen, then according to the component mapping shown in FIG. 8, the button should have black text with a green background and should be positioned on the right-hand portion of the screen of the device.

In one embodiment, one or more component mappings may be combined with an abstract representation. For example, in FIG. 7, the abstract representation 700 and four component mappings 700 (i.e. desktop, tablet, mobile without touchscreen, mobile with touchscreen) are described in a single tag-based file. Thus, one or more files may define an abstract representation and one or more component mappings.

In one embodiment, a component mapping may be stored in any number of formats or languages. A component mapping may be stored in a text file. For example, in FIG. 4 the Desktop Mapping 410 is stored as a text file that separates component mappings and attributes by using a colon. Thus, in FIG. 4 "Question" is a component mapping and "color black" is an attribute for the question component in the Desktop Mapping 410. The "Answer" component mapping of the Desktop Mapping 410 in FIG. 4 has two attributes: "color gray" and "radio". In this embodiment, the "color gray" attribute is used to determine that the color of the text of an answer should be gray and the "radio" attribute is used to determine that a selectable radio button should be displayed beside an answer. In the embodiment shown in FIG. 4, each attribute is entered on a separate line for the Desktop Mapping 410. In other embodiments, a component mapping and multiple attributes may be entered on a single line. For example, referring again to FIG. 4, the "color gray" and "radio" attributes for the "Answer" component mapping in the Desktop Mapping 410 may be entered on a single line. For example, in one embodiment, "Answer: color gray, radio" may be used to define the "color gray" and "radio" attributes for the "Answer" component mapping. Numerous other embodiments and various implementations will be apparent to those of ordinary skill in the art.

A component mapping may be in any number of formats or written in any number of languages. A component mapping may be written in a declarative language. For example, in FIG. 5 the Mobile Default Mapping 580 is in a tag-based format. A component mapping may be written in a procedural language. Furthermore, a component mapping may be written in a combination of declarative languages, procedural languages, or both. A component mapping may be in one or more of the following languages, including but not limited to: ActionScript®, ASP, C, C++, HTML, JAVA, JavaScript, JSON, MXML, PHP, XML, or XSLT. Furthermore, a component mapping may be stored in one or more text files. A component mapping may be stored in one or more data stores. A component mapping may be in an archive or compressed format, or both, such as JAR, ZIP, RAR, ISO, or TAR. In some embodiments, a component mapping may be compiled whereas in other embodiments a component mapping may not be compiled. A combination of languages, formats, and/or data stores may be used to define a component mapping according to various embodiments.

Referring again to FIG. 3, after creating at least one component mapping 320, the method 300 proceeds to block 330. In block 330, at least one version of an application based on the abstract representation and at least one component mapping is generated. For example, in one embodiment a desktop version of an application may be generated and executed on an electronic device based at least in part on the abstract representation 400 and the desktop mapping shown 410 in FIG. 4. In an embodiment, a mobile version of an application based on the abstract representation 400 and the mobile mapping 420 shown in FIG. 4 may be generated on-the-fly in response to a request from a mobile device such as a mobile phone. For example, a mobile phone may send a request to a server for an application, the server may determine that the requesting device is a mobile phone, and may on-the-fly generate and send a mobile version of the application to the mobile phone based at least in part on the abstract representation and the mobile component mapping. In this embodiment, the mobile phone may execute and render the received mobile version of the application. Additional embodiments regarding the generation of at least one version of an application based on an abstract representation and at least one component mapping are further described herein or would be apparent to one of skill in the art.

In one embodiment, a version of an application may be in any number of formats or written in any number of languages. A version of an application may be in one or more declarative languages. A version of an application may be in one or more procedural languages. A version of an application may include a combination of one or more declarative languages and one or more procedural languages. For example, a version of an application may include or be in communication with files including one or more of the following languages, including but not limited to: ActionScript®, AJAX, ASP, C, C++, Flash®, HTML, JAVA, JavaScript, JSON, MXML, PHP, XML, or XSLT. In embodiments, a version of an application may be stored in or in communication with one or more files or data stores. A version of an application may be in an archive or compressed format, or both, such as JAR, ZIP, RAR, ISO, or TAR. A version of an application may be compiled or may not be compiled. A combination of languages, formations, and/or data stores may be used to define or communicate with a version of an application according to various embodiments.

Method of Sending a Version of an Application to a Device

Figure 9:
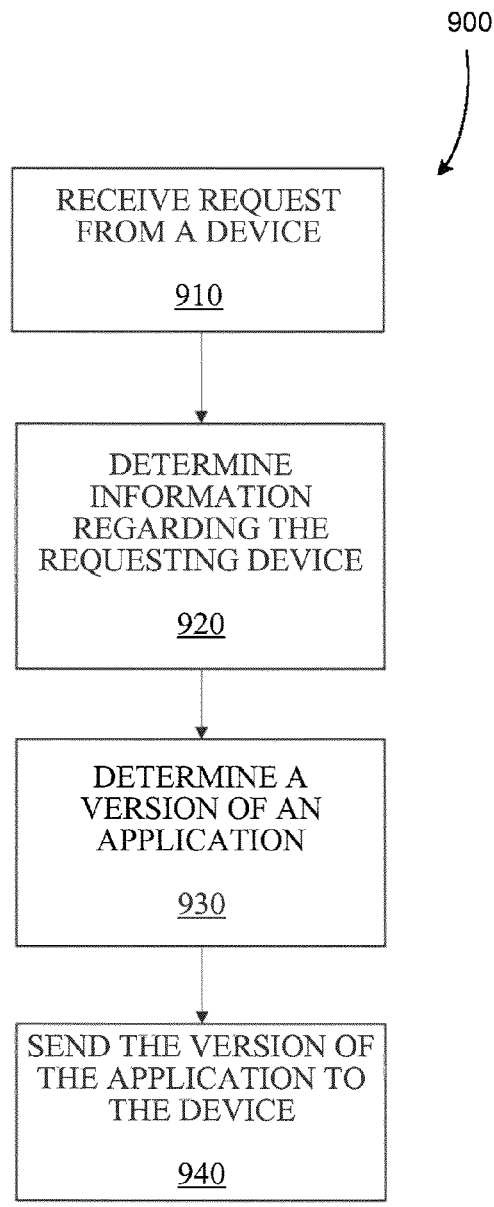
FIG. 9 is a flow chart illustrating a method of responding to a request from a device for an application according to one embodiment.

FIG. 9 illustrates a flow chart directed to a method 900 of responding to a request for an application from a device according to one embodiment. The description of the method 900 of FIG. 9 will be made with respect to FIG. 1 according to an embodiment.

The method shown in FIG. 9 begins in block 910 when a request is received from a device. For example, in FIG. 1, the server 150 may receive a request from the tablet computer 120, the desktop computer 130, or the mobile phone 140.

A request may include information about the requesting device 120-140, the location of the requesting device 120-140, the type of network or networks the requesting device 120-140 is in communication with, or other information. For example, in one embodiment the request may include a request for a specific version of an application. In another embodiment, the request may include a request for an application and the device receiving the request determines which version of the application to send to the requesting device. A request may include the manufacturer, model number, year manufactured, or additional information regarding hardware specifications of the requesting device, one or more internal components in the requesting device, or one or more devices in communication with the requesting device.

A request may include information regarding features of the device such as display size, display resolution, number of displays, whether a display is touch-sensitive, whether a device has a keyboard or a mouse, or additional information regarding the features of the requesting device. In addition, a request may include information regarding the requesting device's processors or hardware such as the number of processors, the speed of a processor, the model of a processor, the number of graphics cards, an amount of memory, an amount of cache, etc. A request may include information regarding software installed or currently running on the requesting device 120-140 such as the operating system, type of web browser, version number, whether an application is installed, available plug-ins, etc. A request may include information regarding settings of an application or applications on the requesting device 120-140 such as whether JavaScript is enabled, whether cookies are enabled, or other settings related to the requesting device 120-140. In embodiments, a request may include location information such as the geographic location of the requesting device 120-140 or GPS coordinates.

Referring back to the method 900 shown in FIG. 9, after receiving the request from a requesting device 910, the method 900 proceeds to block 920. In block 920, information regarding the requesting device is determined. For example, in FIG. 1 the server 150 may determine information regarding the tablet 120 after receiving a request 910 from the tablet 120.

In embodiments, the information determined regarding the requesting device 120-140 may be determined directly from the request. For example, if a request from a requesting device 120-140 includes the manufacturer and model number of the requesting device 120-140, then the device receiving the request 150 may be able to determine the manufacturer and model number of the requesting device 120-140 directly from the request. Thus, in embodiments, any or all of the information sent in a request may be used to determine information regarding the requesting device 120-140. In some embodiments, the receiving device 150 may use information received from a request to determine additional information regarding a requesting device 120-140. For example, in one embodiment the requesting device 120-140 may send a request to a receiving device 150 that includes an internet protocol (IP) address. In this embodiment, the receiving device 150 may use the IP address to determine a location for the requesting device 120-140. Furthermore, in this embodiment, the receiving device 150 may use the IP address or the determined location to determine a language associated with the requesting device 120-140.

After determining information regarding the requesting device 920, the method 900 proceeds to block 930. In block 930, a version of an application is determined. For example, after receiving a request from the tablet computer 120 and determining information regarding the tablet computer 120, the server may determine a version of an application to send to the tablet computer 120.

In embodiments, a version of an application is determined based at least in part on the request received from the requesting device or from the information determined regarding the requesting device, or both. For example, if a request includes information indicates that the requesting device is a mobile phone, then the receiving device 150 may determine that a mobile version of an application should be sent to the requesting device 120-140. Similarly, if a receiving device 150 determines that the location of the requesting device 120-140 is in a location where Spanish is the primary language, then the receiving device 150 may determine that a Spanish version of an application should be sent to the requesting device 120-140. In embodiments, any or all of the information received from the requesting device 120-140 in the request or determined by the receiving device 150 may be used to determine a version of an application to send to the requesting device 120-140.

In one embodiment, the receiving device may require additional communication with the requesting device in order to determine information about the requesting device. For example, an initial request from a requesting device 120-140 may be received by a receiving device 150 and the receiving device 150 may determine that additional information is needed from the requesting device 120-140. For example, in one embodiment, an initial request may include information that informs the receiving device 150 that the requesting device 120-140 wants an application. The initial request, however, may not provide sufficient information for the receiving device 150 to determine a version of the application to send to the requesting device 120-140. For example, the initial request may not include a display size and, thus, the receiving device 150 may not be able to determine whether a mobile version or a desktop version of the application should be sent to the requesting device 120-140. In some embodiments, the receiving device 150 may request more information from the requesting device 120-140 in order to determine a version of an application to send the requesting device 120-140. In other embodiments, the receiving device 150 may use some or all of the information received during the initial request to determine a version of an application.

In one embodiment, the determined version of the application may be in any number of formats or written in any number of languages. The determined version of the application may be in one or more declarative languages. The determined version of the application may be in one or more procedural languages. The determined version of the application may include a combination of one or more declarative languages and one or more procedural languages. For example, the determined version of the application may include or be communication with files including one or more of the following languages, including but not limited to: ActionScript®, AJAX, ASP, C, C++, Flash®, HTML, JAVA, JavaScript, JSON, MXML, PHP, XML, or XSLT. The determined version of the application may be stored in or in communication with one or more files or data stores. The determined version of the application may be in an archive or compressed format, or both, such as JAR, ZIP, RAR, ISO, or TAR. The determined version of the application may be compiled whereas in other embodiments a version of an application may not be compiled. A combination of languages, formations, and/or data stores may be used to define or communicate with the determined version of the application according to various embodiments.

Numerous versions of the application may be stored on the receiving device 150 or the receiving device 150 may be in communication with other devices that have one or versions of the application stored on the device. The receiving device 150 may determine a version of the application based at least in part on the available versions of an application. For example, if a receiving device 150 only has a mobile version and a desktop version of an application, then the determined version of the application may be determined between the mobile version and the desktop version.

In one embodiment, the version of the application may be determined or compiled, or both, on-the-fly. For example, the receiving device 150 may comprise or be in communication with an abstract representation and at least one component mapping. In this embodiment, the receiving device 150 may determine a component mapping based at least in part on the determined information. For example, the receiving device 150 may determine that a requesting device is a mobile device with a touchscreen 120. In one embodiment, based at least in part on this information, the receiving device 150 may determine that a mobile, touchscreen component mapping should be used. In another embodiment, the receiving device 150 may determine that a requesting device 130 is a desktop computer located in a Spanish speaking location. Based at least in part of this information, in an embodiment the receiving device may determine that a desktop, Spanish component mapping should be used. In embodiments, after determining one or more component mappings, a version of the application is created on-the-fly based at least in part on the determined component mapping or mappings and the abstract representation. For example, in an embodiment, an abstract representation and one or more component mappings may be determined and used to compile a Flash® version of an application. In another embodiment, an abstract representation and one or more component mappings may be determined and used to generate an HTML and JavaScript based version of an application. Numerous other embodiments and implementations would be apparent to a person of ordinary skill in the art.

In one embodiment, a receiving device 150 may determine an abstract representation and one or more component mappings as discussed above. In one embodiment, however, the receiving device 150 may send the abstract representation and one or more component mappings to the requesting device 120-140 and the requesting device 120-140 may use the abstract representation and one or more component mappings to compile or execute a determined version of an application. In such an embodiment, a version of the application may be generated or compiled on-the-fly by the requesting device 120-140. For example, in an embodiment, the receiving device 150 may determine that a mobile, touchscreen version of an application should be sent to the requesting device 120-140. In this embodiment, the receiving device 150 may determine an abstract representation and one or more component mappings associated with a mobile, touchscreen version should be sent to the requesting device 120-140. The receiving device 150 may send the abstract representation and one or more component mappings to the requesting device 120-140 and the requesting device 120-140 may use the abstract representation and one or more component mappings to generate a version of the application. For example, the requesting device 120-140 may generate an HTML and JavaScript based version of the application based on the abstract representation and one or more component mappings the requesting device 120-140 receives from the receiving device 150.

After determining a version of an application 930, the method 900 proceeds to block 940. In block 940, the determined version of the application is sent to the requesting device. For example, referring to FIG. 1, the server 150 may send the determined version of the application to a requesting device 120-140 through the network 110.

Illustrative Renderings of a Selected Version of an Application on a Device

FIG. 10 illustrates a rendering of a desktop version of an application on a desktop computer based on the abstract representation and desktop mapping shown in FIG. 4 according to an embodiment. As can be seen from FIG. 10, the background color of the application is white and corresponds with the application background color attribute for the application specified in the desktop mapping in FIG. 4. In addition, the width of the application shown in FIG. 10 corresponds with the application width attribute for the application specified in the desktop mapping, i.e. 1080 pixels, in FIG. 4. Furthermore, the text of the question on the display shown in FIG. 10 corresponds with the text of the question shown in the abstract representation in FIG. 4 and the color of the text of the question, i.e. black, corresponds with the color attribute for the question component specified in the desktop mapping in FIG. 4. Each of the answers ("Yes", "No", and "Only on game nights") shown in FIG. 10 has a gray text color and a radio button to the left of the text. The text of the answers shown in FIG. 10 correspond with the text of the answers from the abstract representation shown in FIG. 4. Likewise, the color of the text of the answers as well as each answer having a radio button as shown in FIG. 10 corresponds with the color and radio attributes for the answer component specified in the desktop mapping in FIG. 4. Furthermore, the "Submit" button shown in FIG. 10 has black text and a yellow background. The text of the button ("Submit") corresponds with the abstract representation shown in FIG. 4. The color of the text of the button and the background color of the button corresponds with the color and background attributes of the button component specified in the desktop mapping shown in FIG. 4. Thus, attributes for components specified in one or more component mappings may be used to determine at least layouts, color schemes, functions, or a combination thereof, for a version of an application according to embodiments.

Figure 11:
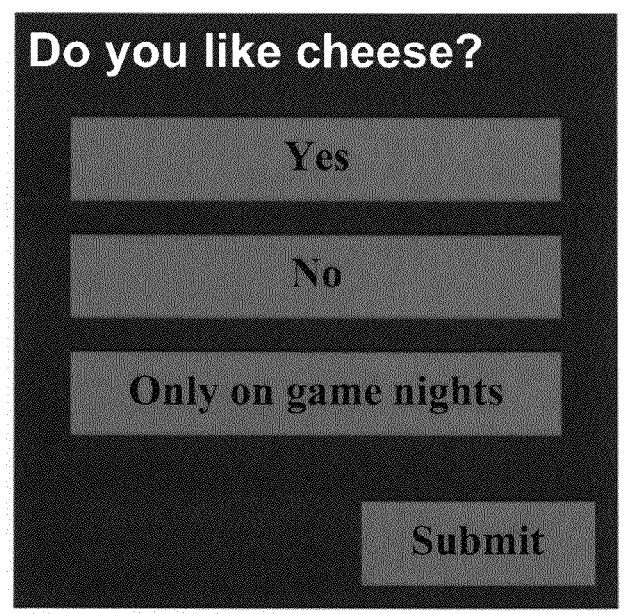
FIG. 11 illustrates a rendering of a mobile version of an application on a mobile device based on the abstract representation and mobile mapping shown in FIG. 4 according to an embodiment.

FIG. 11 illustrates a rendering of a mobile version of an application on a mobile device based on the abstract representation and mobile mapping shown in FIG. 4 according to an embodiment. As can be seen from FIG. 11, the background color (black) and width of the application (640 pixels) corresponds with the application background color attribute and the background width attribute for the application specified in the mobile mapping in FIG. 4. The text of the question shown on the display in FIG. 11 corresponds with the text of the question shown in the abstract representation in FIG. 4 whereas the color of the text of the question corresponds with the color attribute of the question component specified in the mobile mapping shown in FIG. 4. Similarly, the text of the answers shown in FIG. 11 correspond with the text of the answers shown in the abstract representation in FIG. 4, but the color of the text (black) and the background color (red) of the answers corresponds with the color attribute and background attribute for the answer component specified in the mobile mapping shown in FIG. 4. Likewise, the text of the button ("Submit") shown in FIG. 11 corresponds with the text of the button shown in the abstract representation shown in FIG. 4 whereas the color of the text (black) and the background color (green) of the button corresponds with the color and background attributes for the button component specified in the mobile mapping shown in FIG. 4. In addition, the position of the button (i.e. on the right-hand side of the screen) shown in FIG. 11 corresponds with the position attribute for the button component specified in the mobile mapping shown in FIG. 4. Thus, attributes for components specified in one or more component mappings may be used to determine at least layouts, color schemes, functions, or a combination thereof, for a version of an application according to embodiments.

Figure 12:
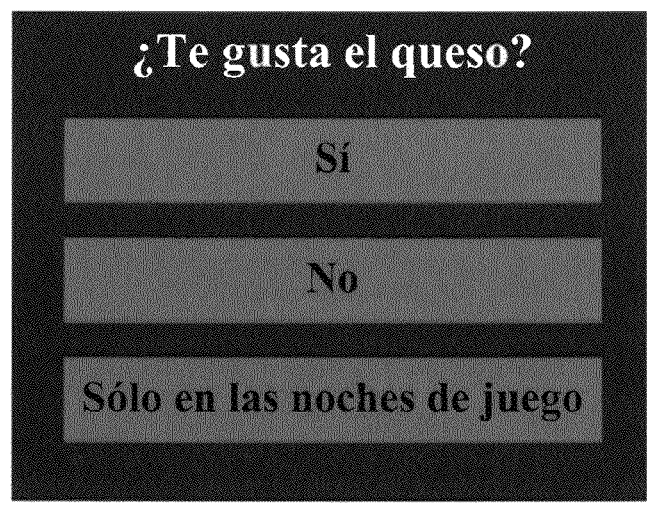
FIG. 12 illustrates a rendering of a Spanish, touchscreen-enabled, mobile version of an application based on the abstract representation and mobile touchscreen mapping and mobile default mapping shown in FIG. 5 according to an embodiment.

FIG. 12 illustrates a rendering of a Spanish, touchscreen-enabled, mobile version of an application based on the abstract representation and mobile touchscreen mapping and mobile default mapping shown in FIG. 5 according to an embodiment. As can be seen from FIG. 12, the background color (black) of the application corresponds with the application background color attribute specified in the mobile default mapping in FIG. 5. The text of the question shown on the display in FIG. 12 corresponds with the text of the question shown in the QUESTION1.ES file that is referenced by the question component in the abstract representation in FIG. 5. Similarly, the text of the answers shown in FIG. 12 correspond with the text of the answers shown in the ANSWER1.ITEMS.ES file that is referenced by the answer component in the abstract representation in FIG. 5. The color of the text of the question (white) shown in FIG. 12 corresponds with the color attribute for the question component specified in the mobile default mapping shown in FIG. 5. Furthermore, the position of the question (centered) shown in FIG. 12 corresponds with the position attribute for the question component specified in the mobile touchscreen mapping shown in FIG. 5. The color of the text of the answers (black) and the background color of the answers (red) correspond with the color and background attributes for the answer component specified in the mobile default mapping shown in FIG. 5. In addition, in this embodiment, the button component is not shown on the display in FIG. 12 because the hide attribute for the button component specified in the mobile touchscreen mapping is "true". In one embodiment, a version of an application may comprise components—such as the button component in the previous example—that are not used by the application. In other embodiments, a version of an application only includes the components that may be used by the application.

Referring still to the embodiment in FIG. 12, each of the answers may be a touch-enabled answer. For example, if a user touches a location on the display that corresponds with the answer "No", then "No" may be selected as the answer to the question. In one embodiment, a version of an application determines whether an answer is a touch-enabled answer based at least in part on an attribute specified in a component mapping. For example, in FIG. 12, the answers may be determined to be touch-enabled answers because the touchscreen attribute for the button component is set to "enabled". In another embodiment, the answers may be determined to be touch-enabled answers because the hide attribute for the button component is set to "true". Numerous additional embodiments and implementations would be obvious to one of ordinary skill in the art.

Illustrative Mappings and Renderings

Figure 13:
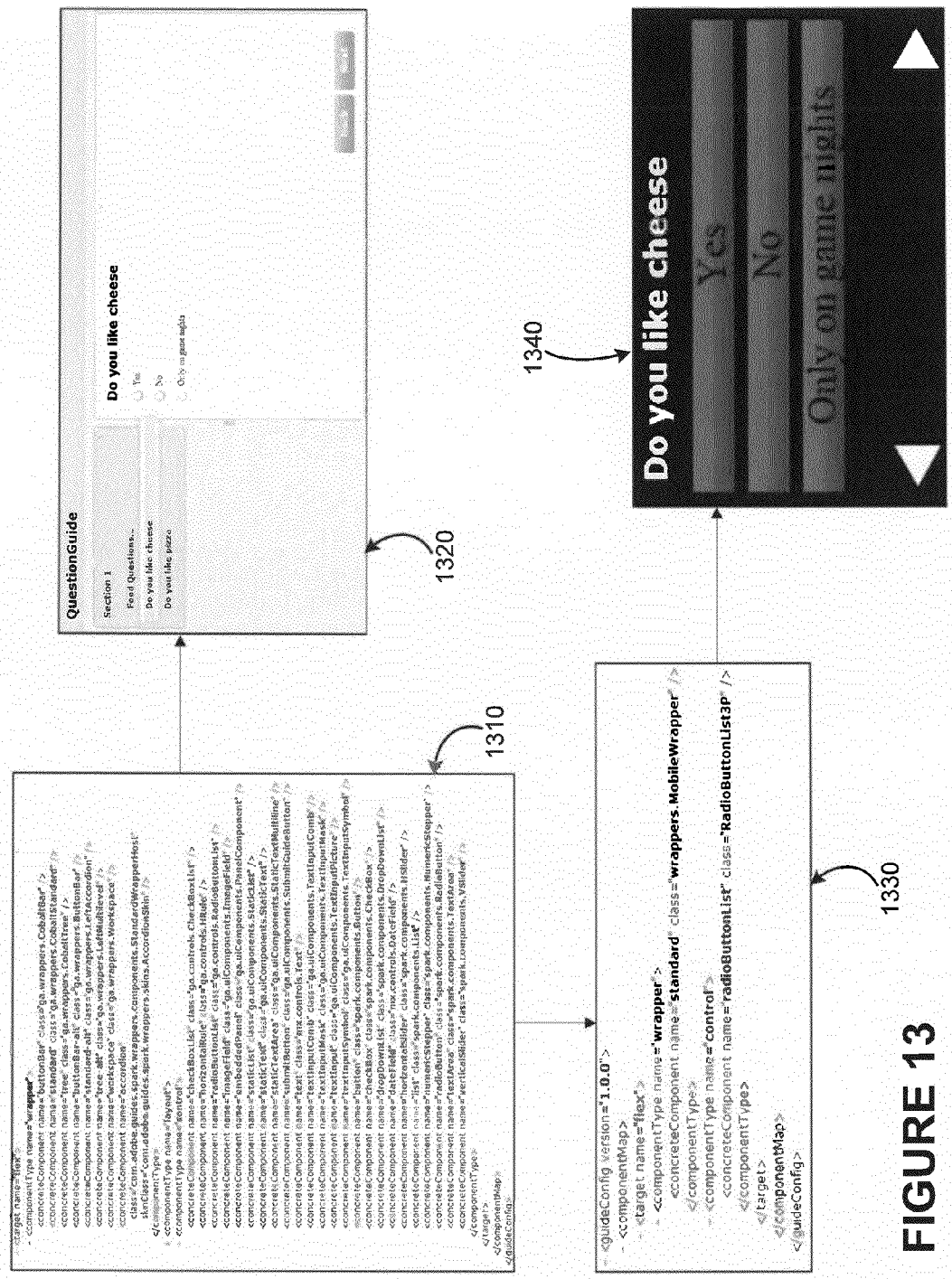
FIG. 13 illustrates partial mappings and renderings of two versions of an application based on the component mappings according to an embodiment.

FIG. 13 illustrates partial mappings and renderings of two versions of an application according to an embodiment. FIG. 14 provides an enlarged view of partial mapping 1310 shown in FIG. 13. FIG. 15 provides an enlarged view of partial mapping 1330 shown in FIG. 13.

In the embodiment shown in FIG. 13, partial mapping 1310 is an XML file that includes attributes or functions for various components. For example, partial mapping 1310 includes '<target name="flex">' as shown in FIG. 14 that indicates the mapping is for a Flash® version of the application. In FIG. 13, rendering 1320 illustrates a rendering of a Flash® version of an application created using partial mapping 1310 according to one embodiment. In this rendering 1320, questions such as "Do you like cheese" and "Do you like pizza" are shown on the left side of the screen. The currently selected question, "Do you like cheese", as well as potential answers are displayed on the right side of the screen. The background of the question and answer section of the screen is white. In addition, in this embodiment, two buttons are displayed on the lower, right portion of the rendering. One button has the text "Back" and the other button has the text "Next". The text for each of the buttons is white and the background for each of the buttons is green.

In the embodiment shown in FIG. 13, partial mapping 1330 is an XML file that includes attributes or functions for various components. Partial mapping 1330 is for a mobile version of an application. As shown in FIG. 13, partial mapping 1330 uses many of the attributes or functions described in partial mapping 1310. Some attributes or functions, however, may be overridden by partial mapping 1310. For example, partial mapping 1330 shows that "MobileWrapper" should be used for the "Standard" component rather than the "CobaltStandard" specified in partial mapping 1310. Partial mapping 1330 also specifies that "RadioButtonList3P" should be used for the "radioButtonList" component, thus, overriding the "RadioButtonList" specified in partial mapping 1310.

In FIG. 13, rendering 1340 illustrates a rendering of a mobile version of the application created using partial mapping 1310 and partial mapping 1330. In this rendering 1340, a question is shown at the top of the screen. The potential answers to the question are shown below the question and ach answer has a red background. A user of this version of the application can navigate from one question to another question by using the white arrows on the lower left and lower right of the screen. As shown by rendering 1320 and rendering 1340, the look or functions, or both, of various versions of an application can vary greatly. Thus, FIG. 13 demonstrates one embodiment in which major changes in a version of an application may be made by adding mappings that override attributes of components in a previously created mapping.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method, comprising:
receiving, by a processor, a request from a device for an application;
determining, by a processor, information about the device based at least in part on the request;
determining, by a processor, a version of the application by at least:
determining an abstract representation of the application, the abstract representation comprising a plurality of components for a user interface for the application; and
determining a mapping from a plurality of available mappings based at least in part on the information about the device, the mapping comprising a plurality of attributes corresponding with one or more components of the abstract representation and defining a look for the user interface;
dynamically generating, by a processor and in response to receiving the request, the version of the application by at least generating the user interface having the look based at least in part on the plurality of attributes in the determined mapping and the plurality of components in the determined abstract representation, wherein generating the user interface comprises determining a location in the user interface for a component from the plurality of components in the determined abstract representation based on an attribute for the component from the plurality of attributes in the determined mapping, wherein the generated user interface comprises the component at the determined location; and
sending, by a processor, the version of the application to the device.

2. The method of claim 1, wherein generating the user interface comprises:
determining a color for a component from the plurality of components in the determined abstract representation based on an attribute for the component from the plurality of attributes in the determined mapping, wherein the generated user interface comprises the component having the determined color.

3. The method of claim 1, wherein the version of the application is based at least in part on a second mapping.

4. The method of claim 1, wherein the mapping comprises at least one declarative language.

5. The method of claim 1, wherein the device comprises at least one of:
a mobile phone, a tablet computer, a desktop computer, a laptop, a personal digital assistant (PDA), or a WiFi-capable computer.

6. The method of claim 1, wherein:
determining information about the device comprises:
determining a hardware specification associated with the device, the hardware specification comprising at least one of a number of graphics cards, an amount of memory, an amount of cache, or a number of processors; and
determining the mapping from the plurality of available mappings based at least in part on the information about the device comprises:
determining the mapping based at least in part on the hardware specification.

7. The method of claim 1, wherein:
determining information about the device comprises:
determining a display size of a display for the device; and
determining the mapping from the plurality of available mappings based at least in part on the information about the device comprises:
determining the mapping based at least in part on the display size of the display.

8. The method of claim 1, further comprising:
sending a second request to the device, the second request indicating that additional information about the device is needed; and
receiving a response from the device, the response providing at least a portion of the additional information about the device,
wherein determining the mapping from the plurality of available mappings based at least in part on the information about the device comprises determining the mapping based at least in part on the portion of the additional information about the device.

9. A method, comprising:
in response to receiving a first input, creating, by a processor, an abstract representation of an application, the abstract representation comprising a plurality of components for a user interface for the application;
in response to receiving a second input, creating, by a processor, a plurality of mappings, each of the plurality of mappings comprising at least one attribute corresponding with at least one of the plurality of components of the abstract representation and defining a respective look for the user interface; and
generating, by a processor, a version of the application based on the abstract representation and at least one mapping from the plurality of mappings by generating the user interface having a look based at least in part on the plurality of attributes in the at least one mapping, wherein generating the user interface comprises determining a color for a component from the plurality of components in the abstract representation based on an attribute for the component from the plurality of attributes in the at least one mapping, wherein the generated user interface comprises the component having the determined color.

10. The method of claim 9 wherein each of the plurality of mappings represents at least one version of the application.

11. The method of claim 9 wherein the abstract representation and at least one of the plurality of mappings are created in an application development environment (ADE).

12. The method of claim 9 wherein the abstract representation comprises at least one declarative language.

13. The method of claim 9 wherein at least one of the plurality of mappings comprises at least one declarative language.

14. A system, comprising:
a processor; and
a memory coupled with the processor and having instructions stored thereon, which, when executed by the processor, cause the processor to perform operations comprising capable of:
connecting to a network; and
communicating with a requesting device through the network; and
the processor configured to:
receive a request from the requesting device for an application;
determine information about the requesting device based at least in part on the request;
determine a version of the application by at least determining an abstract representation of the application and at least one mapping from a plurality of available mappings based at least in part on the information about the requesting device, the abstract representation comprising a plurality of components for a user interface for the application, the at least one mapping comprising a plurality of attributes corresponding with one or more components of the abstract representation and defining a look for the user interface;
generate the version of the application on-the-fly by at least generating the user interface having the look based at least in part on the plurality of attributes in the determined mapping and the plurality of components in the determined abstract representation, wherein generating the user interface comprises determining a location in the user interface for a component from the plurality of components in the determined abstract representation based on an attribute for the component from the plurality of attributes in the determined mapping, wherein the generated user interface comprises the component at the determined location; and
send the generated version of the application to the requesting device.

15. The system of claim 14, wherein:
the information about the requesting device comprises an operating system installed on the requesting device;
the at least one mapping from the plurality of available mappings is determined based on the operating system installed on the requesting device; and
the generated version of the application is configured to executable by the operating system installed on the requesting device.

16. The system of claim 14, wherein:
the information about the requesting device comprises information usable to determine a geographic location of the requesting device;

the at least one mapping from the plurality of available mappings is determined based at least in part on the geographic location of the requesting device; and the generated version of the application is configured for the geographic location of the requesting device.

17. The system of claim 14, wherein:

the information about the requesting device comprises a browser running on the requesting device and whether a plug-in for the browser is installed or enabled on the requesting device, wherein the at least one mapping from the plurality of available mappings is determined based at least in part on the browser running on the requesting device and whether the plug-in for the browser is installed or enabled on the requesting device; and the generated version of the application is configured to be compatible with the browser and the plug-in if the plug-in is installed and enabled on the requesting device, and compatible with the browser and operable without the plug-in if the plug-in is not installed or is not enabled on the requesting device.

18. The system of claim 14, wherein the abstract representation comprises at least one declarative language.

19. A non-transitory computer-readable medium having program code stored thereon, that when executed by a computer, causes the computer to:

receive a request from a device for an application;

determine information about the device based at least in part on the request;

determine a version of the application by at least:

determining an abstract representation of the application, the abstract representation comprising a plurality of components for a user interface for the application; and determining a mapping from a plurality of available mappings based at least in part on the information about the device, the mapping comprising a plurality of attributes corresponding with one or more components of the abstract representation and defining a look for the user interface;

dynamically generate the version of the application on-the-fly by at least generating the user interface having the look based at least in part on the plurality of attributes in the determined mapping and the plurality of components in the determined abstract representation, wherein generating the user interface comprises determining a color for a component from the plurality of components in the abstract representation based on an attribute for the component from the plurality of attributes in the at least one mapping, wherein the generated user interface comprises the component having the determined color; and send the version of the application to the device.

20. The method of claim 1, wherein a first mapping from the plurality of available mappings comprises a first attribute comprising a first type of form field for a component from the plurality of components in the determined abstract representation and a second mapping from the plurality of available mappings comprises a second attribute comprising a second type of form field different than the first type of form field for the component.

21. The method of claim 1, wherein:

a first mapping from the plurality of available mappings is configured for a first device comprising a first display;

a second mapping from the plurality of available mappings is configured for a second device comprising a second display smaller in size than the first display; and determining the mapping from the plurality of available mappings based at least in part on the information about the device comprises selecting between the first mapping and the second mapping based on a display size of the requesting device.

22. The method of claim 21, wherein:

a third mapping from the plurality of available mappings is configured for a third device comprising a touchscreen, and determining the mapping from the plurality of available mappings based at least in part on the information about the device comprises selecting the third mapping if the requesting device comprises the touchscreen.

23. The method of claim 21, wherein:

a third mapping from the plurality of available mappings is configured for a first language, a fourth mapping from the plurality of available mappings is configured for a second language, and determining the mapping from the plurality of available mappings based at least in part on the information about the device comprises selecting the third mapping if the information about the device indicates that the first language should be used and selecting the fourth mapping if the information about the device indicates that the second language should be used.

24. The method of claim 1, wherein the determined mapping comprises at least a first mapping and a second mapping.

25. The method of claim 3, wherein:

the determined mapping comprises a first attribute for a component from the plurality of components in the determined abstract representation and the second mapping comprises a second attribute for the component;

the generated version of the application comprises either the first attribute or the second attribute, but not both, based on a hierarchy between the determined mapping and the second mapping.

26. The method of claim 25, wherein the first attribute comprises a first color and the second attribute comprises a second color different than the first color.

27. The method of claim 12 wherein the abstract representation comprises at least one procedural language.

* * * * *